(12) United States Patent
Tokuyama et al.

(10) Patent No.: US 9,193,416 B2
(45) Date of Patent: Nov. 24, 2015

(54) BICYCLE SPROCKET SUPPORT ASSEMBLY

(75) Inventors: Kouji Tokuyama, Sakai (JP); Takanori Kanehisa, Sakai (JP); Yoshimitsu Miki, Sakai (JP); Kazuki Koshiyama, Sakai (JP)

(73) Assignee: Shimano Inc., Osaka (JP)

( * ) Notice: Subject to any disclaimer, the term of this patent is extended or adjusted under 35 U.S.C. 154(b) by 960 days.

(21) Appl. No.: 12/627,135

(22) Filed: Nov. 30, 2009

(65) Prior Publication Data

US 2011/0130233 A1  Jun. 2, 2011

(51) Int. Cl.
F16H 55/12 (2006.01)
F16H 55/30 (2006.01)
B62M 9/10 (2006.01)

(52) U.S. Cl.
CPC .................................. B62M 9/10 (2013.01)

(58) Field of Classification Search
USPC ............................ 474/160, 152, 82
See application file for complete search history.

(56) References Cited

U.S. PATENT DOCUMENTS

| | | | | |
|---|---|---|---|---|
| 2,533,190 A | | 12/1950 | Griffin | |
| 3,492,883 A | * | 2/1970 | Maeda | 474/80 |
| 4,790,554 A | * | 12/1988 | Siegwart, Jr. | 280/236 |
| 4,869,710 A | * | 9/1989 | Iwasaki | 474/160 |
| 5,194,051 A | * | 3/1993 | Nagano | 474/160 |
| 5,246,402 A | * | 9/1993 | Romano | 474/78 |
| 5,503,600 A | * | 4/1996 | Berecz | 474/160 |
| 5,935,034 A | * | 8/1999 | Campagnolo | 474/160 |
| 6,102,821 A | * | 8/2000 | Nakamura | 474/160 |
| 6,382,381 B1 | * | 5/2002 | Okajima et al. | 192/64 |
| 6,428,437 B1 | * | 8/2002 | Schlanger | 474/160 |
| 6,866,604 B2 | * | 3/2005 | Kamada et al. | 474/160 |
| 7,044,876 B2 | * | 5/2006 | Kamada et al. | 474/160 |
| 7,131,656 B2 | * | 11/2006 | Valle | 280/260 |
| 7,344,463 B2 | * | 3/2008 | Reiter | 474/160 |
| 7,435,197 B2 | * | 10/2008 | Kamada | 474/152 |
| 7,585,240 B2 | * | 9/2009 | Kamada | 474/160 |
| 7,854,673 B2 | * | 12/2010 | Oseto et al. | 474/82 |
| 7,931,553 B2 | * | 4/2011 | Tokuyama | 474/160 |
| 2004/0070166 A1 | * | 4/2004 | Valle | 280/260 |
| 2004/0121867 A1 | * | 6/2004 | Reiter | 474/160 |
| 2006/0172840 A1 | * | 8/2006 | Kamada | 474/152 |

FOREIGN PATENT DOCUMENTS

| | | |
|---|---|---|
| CN | 1400134 A | 3/2003 |
| CN | 2769169 Y | 4/2006 |
| GB | 2 019 328 A | 10/1979 |
| TW | 560480 U | 11/2003 |
| TW | M346554 U | 12/2008 |

* cited by examiner

Primary Examiner — Michael Mansen
Assistant Examiner — Henry Liu
(74) Attorney, Agent, or Firm — Global IP Counselors

(57) ABSTRACT

A bicycle sprocket support assembly is provided with a sprocket support body, a first sprocket support member and at least first and second sprockets. The sprocket support body has a tubular shaped part with an exterior surface and an interior surface arranged around a center longitudinal axis. The first sprocket support member is integrated with the exterior surface of the sprocket support body as a one-piece, unitary member and projects radially from the exterior surface of the sprocket support body. The first and second sprockets are fixed to the first sprocket support member by at least one fastener with the first and second sprockets being supported at axially spaced apart locations along the center longitudinal axis of the sprocket support body.

11 Claims, 5 Drawing Sheets

BICYCLE SPROCKET SUPPORT ASSEMBLY

BACKGROUND OF THE INVENTION

1. Field of the Invention

The present invention relates generally to a bicycle sprocket support assembly for a rear hub of a bicycle.

2. Background Information

A bicycle wheel typically includes a central hub, a plurality of spoke extending outwardly from the hub and a rim coupled to the outer ends of the spokes. The hub typically includes a spindle or hub shaft mounted in a detachable and non-rotatable manner to the frame of the bicycle, a hub body mounted in a freely rotatable manner to the hub shaft, and a pair of bearings configured to support the hub body in such a manner that it can rotate freely with respect to the hub shaft. In the case of a rear hub mounted to the rear wheel of a bicycle, the hub is further provided with a drive body mounted in a freely rotatable manner to the hub shaft and a one-way clutch configured and arranged to transfer rotation from the drive body to the hub body in only one direction (the direction corresponding to forward travel of the bicycle). Examples of this type of rear hub are disclosed in U.S. Pat. Nos. 6,102,821 and 7,585,240, which are assigned to Shimano Inc. With these types of hubs, some sprockets are mounted on sprocket carriers that are sometimes called spiders.

SUMMARY OF THE INVENTION

With the conventional bicycle hubs described above, the sprocket carriers are often heavy in comparison to the sprockets themselves. In particular, the centers of the sprocket carriers are often provided with a splined portion for engaging the splines of a drive body. In view of this situation of the conventional bicycle hubs, it is desirable to provide a bicycle sprocket support assembly that achieves weight-saving and enhance rigidity. Moreover, in view of this situation of the conventional bicycle hubs, it is desirable to provide a bicycle sprocket support assembly that improves the accuracy of positional phases on sprocket teeth mounted on a sprocket support body In accordance with a first aspect, a bicycle sprocket support assembly is provided that comprises a sprocket support body, a first sprocket support member and at least first and second sprockets. The sprocket support body has a tubular shaped part with an exterior surface and an interior surface arranged around a center longitudinal axis. The first sprocket support member is integrated with the exterior surface of the sprocket support body as a one-piece, unitary member and projects radially from the exterior surface of the sprocket support body. The first and second sprockets are fixed to the first sprocket support member by at least one fastener with the first and second sprockets being supported at axially spaced apart locations along the center longitudinal axis of the sprocket support body.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
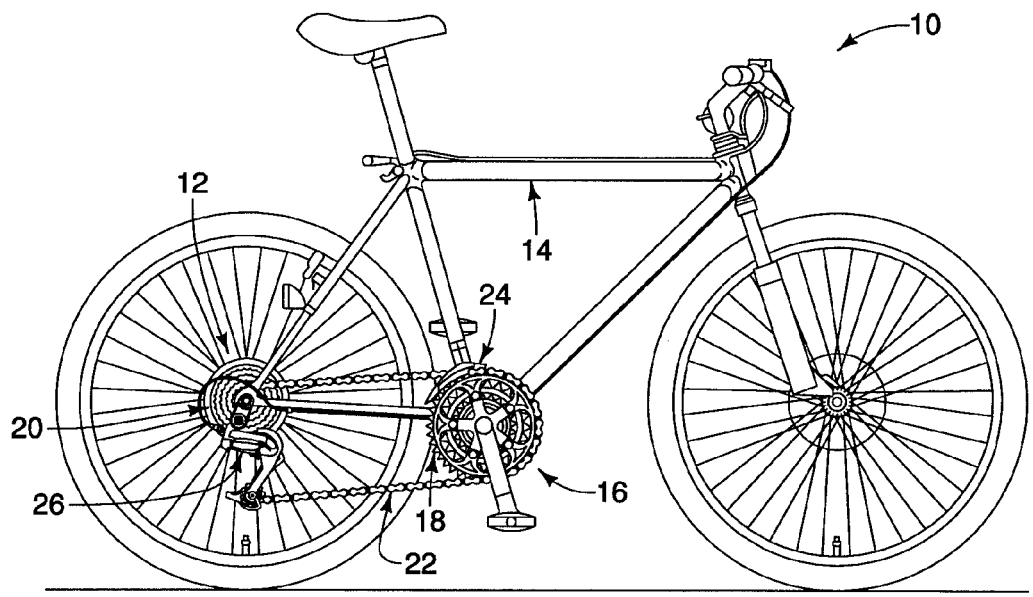
FIG. 1 is a side elevational view of a bicycle equipped a rear hub having a bicycle sprocket support assembly in accordance with a first embodiment.
Figure 2:
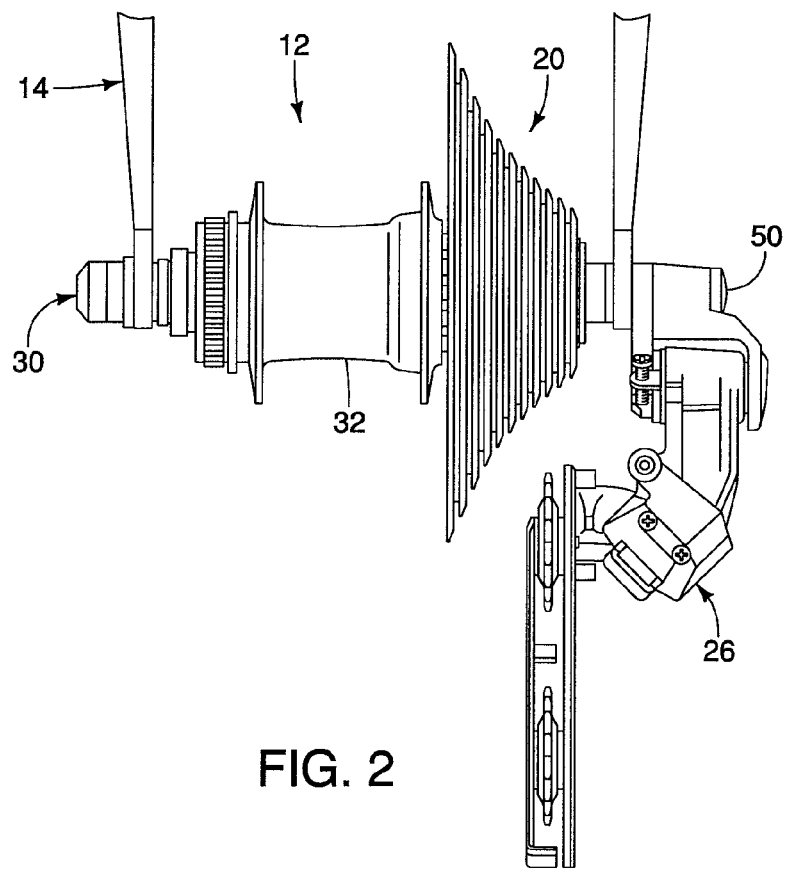
FIG. 2 is a rear elevational view of the rear hub and the rear derailleur illustrated in FIG. 1.

Referring initially to FIGS. 1 and 2, a bicycle 10 is illustrated that is equipped with a rear hub 12 in accordance with a first embodiment. The bicycle 10 is illustrated as an off-road bicycle, i.e., an all terrain bicycle (ATB) or a mountain bike (MTB). However, the bicycle sprocket support assembly can be used with other types of bicycles as needed and/or desired. The bicycle 10 includes a frame 14 that supports a drive train 16. The drive train 16 includes a front crank set 18 with pedals, a bicycle sprocket support assembly 20, a front derailleur 24 and a rear derailleur 26. The drive unit 105 operates in a conventional manner. Moreover, the precise constructions of the front crank set 18, the front derailleur 24 and the rear derailleur 26 are not important to the construction of the bicycle sprocket support assembly 20. Thus, the front crank set 18, the front derailleur 24 and the rear derailleur 26 will not be described and/or illustrated in detail.

The rear hub 12 will now be described in order to better understand the bicycle sprocket support assembly 20 in accordance with the first embodiment. In the following explanations, the terms "left" and "right" will be used from the perspective of viewing the bicycle from the rear as seen in FIG. 2. Moreover, as used herein, the following directional terms "forward, rearward, above, downward, vertical, horizontal, below and transverse" as well as any other similar directional terms refer to those directions of a bicycle equipped with the rear hub 12 having the bicycle sprocket support assembly 20. Accordingly, these terms, as utilized to describe the bicycle sprocket support assembly 20 should be interpreted relative to a bicycle equipped with the bicycle sprocket support assembly 20.

Figure 3:
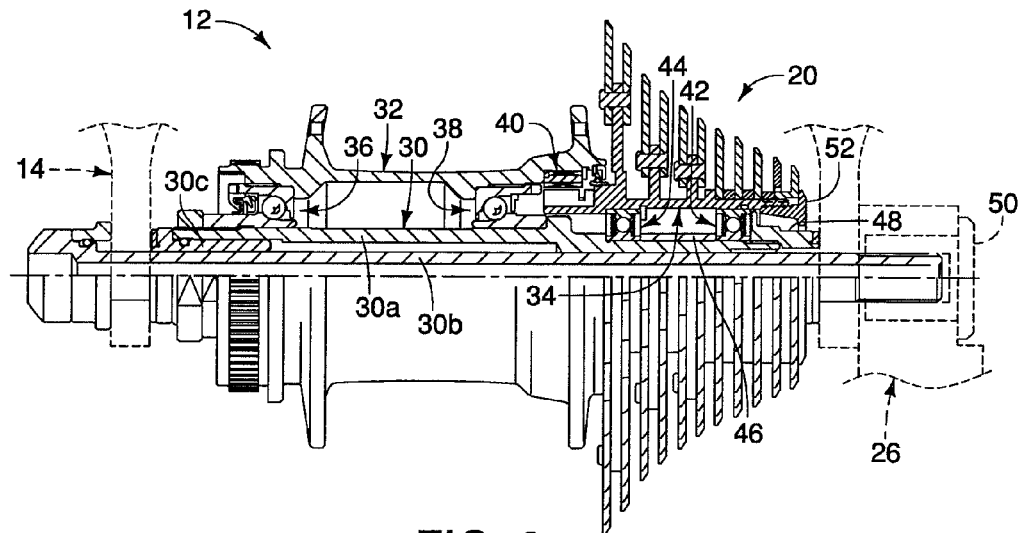
FIG. 3 is a partial cross sectional view of the rear hub illustrated in FIGS. 1 and 2, with the lower half of the rear hub shown in elevational.

As shown in FIG. 2, the two ends of the rear hub 12 are fastened to a rear part of the frame 14 along with the rear derailleur 26. As shown in FIG. 3, the rear hub 12 basically includes a hub shaft 30, a generally cylindrical or tubular hub body 32 and a drive body 34 (also referred to as a sprocket support body). The drive body 34 is part of the bicycle sprocket support assembly 20 as explained below. The hub shaft 30 is fastened to a rear part of the frame 14, while the hub body 32 is arranged over the outside circumference of the hub shaft 30 with clearance therebetween so as to rotate around the hub shaft 30 via hub rolling bearings 36 and 38 (left and right bearings). The drive body 34 is arranged on the right side of the hub body 32 in such a manner as to be coaxial with the hub body 32 and to partially overlap with the inside of the hub body 32. The precise constructions of the hub shaft 30, the hub body 32 and the hub bearings 36 and 38 are not important to the construction of the bicycle sprocket support assembly 20, and thus, these parts will not be discussed in detail.

Basically, in the illustrated embodiment, the hub shaft 30 basically includes an outer tubular member 30a, an inner threaded shaft 30b and a flange member 30c. The outer tubular member 30a supports the hub rolling bearings 36 and 38 such that the hub body 32 can rotate about the outer tubular member 30a. The threaded shaft 30b passes through the outer tubular member 30a. The flange member 30c is inserted into the left end of the outer tubular member 30a.

The hub body 32 is made of, for example, a lightweight aluminum alloy. The external circumferential surface of the hub body 32 is provided with a pair of spoke attachment flanges for attaching spokes and a brake mounting section for attaching a disk brake. The internal surface of the hub body 32 is provided with one-way clutch mounting section, and supports the outer rings of the hub rolling bearings 36 and 38 in such a manner that it can rotate freely with respect to the hub shaft 30.

The rear hub 12 further includes a one-way clutch 40, a pair of freewheel rolling bearings 42 and 44, a generally cylindrical or tubular spacer 46, a pressing member 48 and a flanged nut 50. The flanged nut 50 provided on the derailleur 26 is screwed onto the right end of the threaded shaft 30b so as to pinch the rear derailleur 26 and the forked rear portion of the frame 14 between the flanged nut 50 and the head section of the threaded shaft 30b, and thereby fastening the hub shaft 30 to the frame 14 in a non-rotatable manner.

The one-way clutch 40 is configured and arranged to transfer rotation from the drive body 34 to the hub body 32 only in the direction corresponding to forward travel of the bicycle 10. The hub rolling bearings 36 and 38 are arranged between the hub body 32 and the hub shaft 30 so as to form first and second rolling bearings that supports the hub body 32 on the hub shaft 30 in a rotatable manner. The freewheel rolling bearings 42 and 44 are arranged in the gap between the drive body 34 and the hub shaft 30 and spaced apart from each other in the axial direction of the hub shaft 30. The freewheel rolling bearings 42 and 44 support the drive body 34 on the hub shaft 30 in a rotatable manner. The spacer 46 is a tubular member arranged in such a manner as to be pinched between the inner rings of the freewheel rolling bearings 42 and 44. The pressing member 48 that is screwed onto the hub shaft 30 so as to press against the fourth freewheel rolling bearing 13 and position the drive body 34 relative to the hub body 32.

In addition to the drive body 34 (also referred to as a sprocket support body), the bicycle sprocket support assembly 20 is also provided with a plurality of sprockets S1 to S11. As will become apparent from this disclosure, the configuration of the bicycle sprocket support assembly 20 of this embodiment makes it possible to omit or reduce conventional spider arms and conventional splined portions of a sprocket carrier in order to achieve weight-saving and to enhance rigidity. Further, because backlash resulting from splined connection between the sprockets S6 to S11 and the drive body 34 can be eliminated with the bicycle sprocket support assembly 20 of this embodiment, it is also possible to improve the accuracy of positional phases on sprocket teeth mounted on the drive body 34.

The sprockets S1 to S11 form a sprocket cluster that is mounted to the drive body 34 in a non-rotatable manner. As explained below, the sprockets S1 to S5 are held on the drive body 34 by a conventional lock ring 52 that threads into the drive body 34. The sprockets S6 to S11 are fixed to the drive body 34 as explained below. The sprockets S1 to S11 increase in outer diameter from the sprocket S1 to the sprocket S11, with each subsequent sprocket from the sprocket S1 to the sprocket S11 having more teeth.

Figure 5:
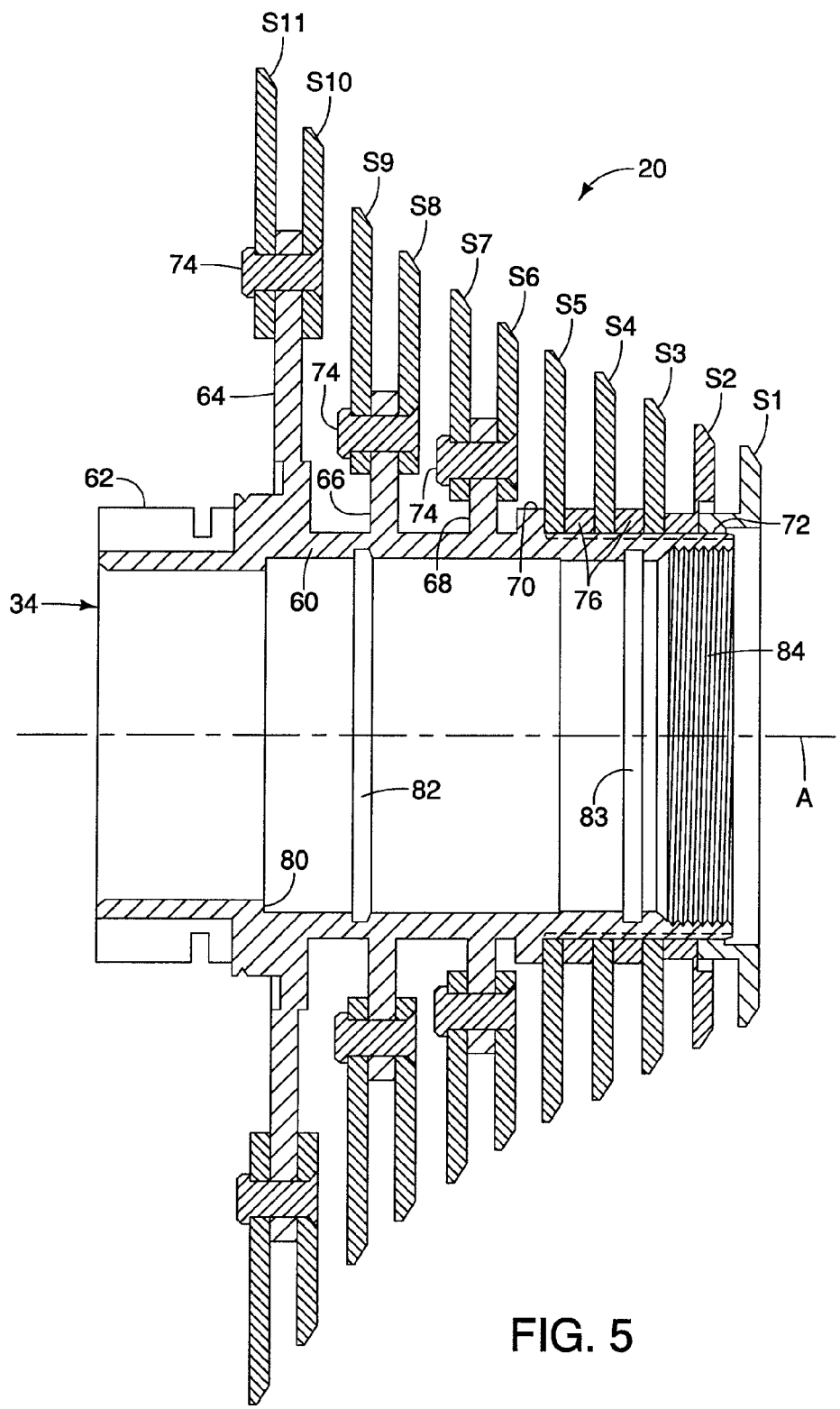
FIG. 5 is an enlarged cross sectional view of the bicycle sprocket support assembly after removal from the rear hub illustrated in FIGS. 1 to 3.

As seen in FIG. 5, the drive body 34 is a one-piece, unitary member that is constructed of a hard rigid material such as a metal material. The drive body 34 is a generally cylindrical body made of, for example, steel and is configured such that the sprockets S1 to S11 can be mounted thereto in a non-rotatable manner. The drive body 34 (i.e., the sprocket support body) includes a tubular shaped part 60 having interior and exterior surfaces arranged around a center longitudinal axis A. The tubular shaped part 60 has an exterior surface with at least two circular arc shaped clutch pawl support sections 62 formed on the left end that is installed inside the hub body 32. The exterior surface of the tubular shaped part 60 also has a first sprocket support member 64, a second sprocket support member 66 and a third sprocket support member 68. The sprocket support members 64, 66 and 68 are integrated with the exterior surface of the tubular shaped part 60 of the drive body 34 as a one-piece, unitary member, with the sprocket support members 64, 66 and 68 being axially spaced along the center longitudinal axis A of the tubular shaped part 60 of the drive body 34.

The sprocket support members 64, 66 and 68 support the sprockets S6 to S11 at axially spaced locations along the center longitudinal axis A of the tubular shaped part 60 of the drive body 34. The sprocket support members 64, 66 and 68 are integrated with the exterior surface of the drive body 34 (i.e., the sprocket support body) as a one-piece, unitary member. The sprocket support members 64, 66 and 68 project in a radial direction from the exterior surface of the drive body 34. The exterior surface of the tubular shaped part 60 also has an annular abutment 70 that acts as a stop for locating the sprocket S5. This annular abutment 70 can be a continuous flange or a plurality of individual abutments, as needed and/or desired. The exterior surface of the tubular shaped part 60 also has a plurality of axially extending splines 72 for retaining the sprockets S1 to S5 in a prescribed orientation on the tubular shaped part 60. The splines 72 are similar to conventional splines used on most freewheels. Spacers 76 are interposed between the sprockets S1 to S5 to axially space the sprockets 51 to S5 along the exterior surface of the tubular shaped part 60 of the drive body 34.

The sprockets S6 to S11 are attached to the sprocket support members 64, 66 and 68 by a plurality of fasteners 74. In the illustrated embodiment, the fasteners 74 constitute fastening elements. As shown, these fasteners 74 or fastening elements can be rivets. Of course, other suitable, fastening structures can be used as needed and/or desired. In the illustrated embodiment, the sprockets S6 and S7 are attached to the sprocket support member 68 using the common ones of the fasteners 74. Similarly, in the illustrated embodiment, the sprockets S8 and S9 are attached to the sprocket support member 66 using the common ones of the fasteners 74, while the sprockets S10 and S11 are attached to the sprocket support member 64 using the common ones of the fasteners 74. In the illustrated embodiment, the sprockets S6 and S7 are located on opposite axially facing sides of the sprocket support member 68 such that the sprocket support member 68 acts as a spacer for the sprockets S6 and S7. Similarly, in the illustrated embodiment, the sprockets S8 and S9 are located on opposite axially facing sides of the sprocket support member 66 such that the sprocket support member 66 acts as a spacer for the sprockets S8 and S9, and the sprockets S10 and S11 are located on opposite axially facing sides of the sprocket support member 64 such that the sprocket support member 64 acts as a spacer for the sprockets S10 and S11.

In the illustrated embodiment, the sprocket support members 64, 66 and 68 have different radial dimensions with respect to the exterior surface of the drive body 34. The sprocket support member 64 has the longest radial dimension of the sprocket support members 64, 66 and 68, while the sprocket support member 68 has the shortest radial dimension of the sprocket support members 64, 66 and 68. Thus, the sprocket support member 66 has a shorter radial dimension than the sprocket support member 64, but a longer radial dimension than the sprocket support member 68. The sprocket support members 64, 66 and 68 can be a continuous annular flange, or can be formed of a plurality of individual flanges. In the case of the sprocket support members 64, 66 and 68 being formed of a plurality of individual flanges, the individual flanges can extend directly from the exterior surface of the drive body 34, or the individual flanges can have a continuous annular flange interconnecting the individual flanges to the exterior surface of the drive body 34. Of course, other configurations, not mentioned, are possible for the sprocket support members 64, 66 and 68.

The interior surface of the tubular shaped part 60 has an annular abutment 80 that limits inward insertion of the freewheel roller bearing 44. An annular recess 82 is also formed in the interior surface of the tubular shaped part 60 to receive a flexible retaining ring that holds the outer race of the freewheel roller bearing 44 in place. Another annular recess 83 is also formed in the interior surface of the tubular shaped part 60 to receive a flexible retaining ring that holds the outer race of the freewheel roller bearing 42 in place. The interior surface of the tubular shaped part 60 also has a threaded section 84 for threadedly receiving the lock ring 52 to retain the retaining the sprockets S1 to S5 on the tubular shaped part 60 of the drive body 34. Thus, each of the sprockets S1 to S5 has a splined mounting aperture that mates with splines 72 of the tubular shaped part 60 of the drive body 34 such that the sprockets S1 to S5 are installed directly on the exterior surface of the tubular shaped part 60 of the drive body 34. In other words, in the illustrated embodiment, the mounting aperture of the sprockets S1 to S5 are mounted directly on the exterior surface of the tubular shaped part 60 of the drive body 34.

Figure 4:
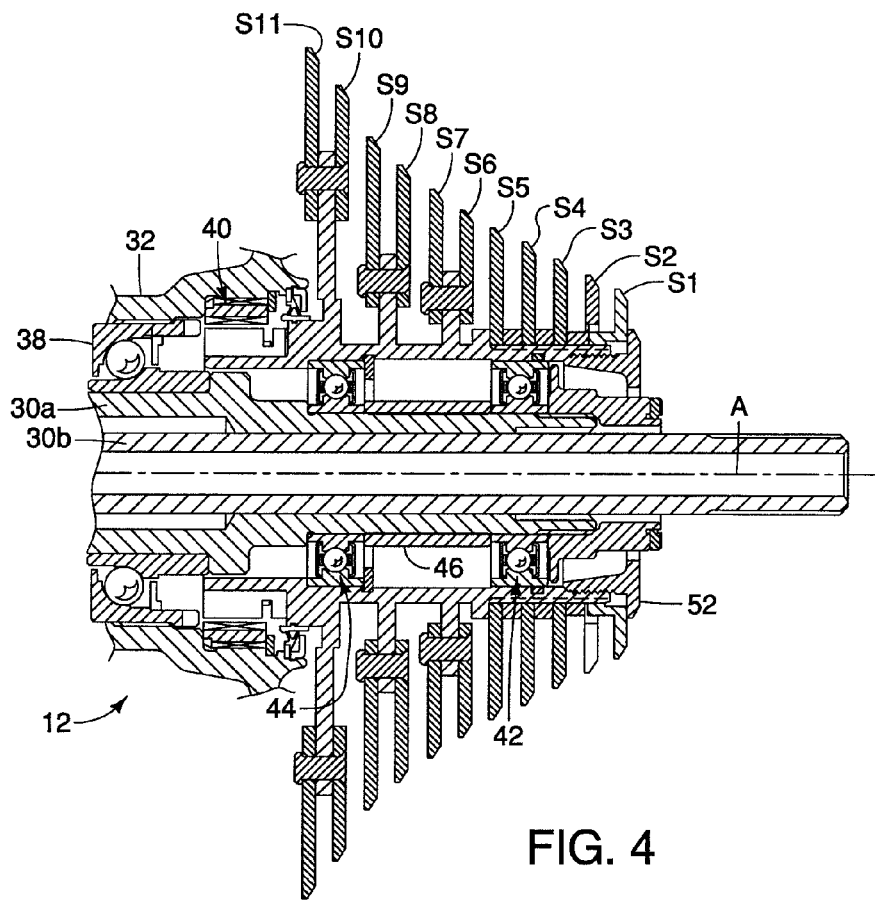
FIG. 4 is an enlarged cross sectional view of the bicycle sprocket support assembly mounted to one end of the rear hub illustrated in FIGS. 1 to 3.

As best seen in FIG. 4, the one-way clutch 40 is a conventional structure that is commonly used in rear hubs, and basically includes a plurality of equally spaced apart clutch pawls, a plurality of saw-tooth-shaped ratchet teeth forming a ratchet part on the interior surface of the hub body 32, and a ring-shaped spring member interconnecting the clutch pawls. The one-way clutch 40 is configured so that the drive body 34 can only rotate in one direction with respect to the hub body 32 on the roller bearings 42 and 44. The circular arc shaped clutch pawl support sections 62 are provided on the external surface of the left-hand end of the drive body 34 and serves to support clutch pawls of the one-way clutch 40 in such a manner that the clutch pawls can stand up (extended position) for rotating the hub body 32 with the drive body 34 and lie down (retracted position) for allowing the hub body 32 to rotate freely with respect to the drive body 34. When the drive body 34 rotates in the direction corresponding to forward motion of the bicycle, the clutch pawls of the one-way clutch 40 engage with the ratchet teeth of the hub body 32 such that the rotation of the drive body 34 is transferred to the hub body 32. Conversely, when the drive body 34 stops rotating and the hub body 32 is rotated in the direction corresponding to forward motion of the bicycle by the wheel, such as during downhill travel, the clutch pawls are pressed by the ratchet teeth in opposition to the spring force of the spring member such that they lie down and rotation is not transferred between the hub body 32 and the drive body 34.

In this illustrated embodiment, the rolling bearings 42 and 44 are sealed ball bearings that are sealed on both sides with the bearing surfaces being formed by races having primarily circumferentially supporting bearing surfaces with a plurality of balls arranged between and in contact with the outer and inner races ("circumferential ball bearings"). The outer races of the rolling bearings 42 and 44 are loosely fitted against the interior surface of the tubular shaped part 60 of the drive body 34 such that they having a degree of clearance between the outer race and the interior surface of the tubular shaped part 60, while the inner races of the rolling bearings 42 and 44 are tightly fitted against the hub shaft 30. Consequently, the outer races of the rolling bearings 42 and 44 can be installed smoothly into the interior surface of the tubular shaped part 60 of the drive body 34. Meanwhile, the inner races of the rolling bearings 42 and 44 can be press fitted onto the hub shaft 30 in such a manner that they are held securely in place.

As best seen in FIG. 5, with the flexible retaining ring installed into the first annular groove 82, the outer race of the rolling bearing 44 is sandwiched between the abutment 80 and the retaining ring such that the outer race of the rolling bearing 44 cannot move in the axial direction. The inner race of the rolling bearing 44 is positioned by being abutted against an abutment of the hub shaft 30 and the spacer 46, which is contacts the inner race of the rolling bearing 44 and the inner race of the rolling bearing 42 for positioning the rolling bearings 42 and 44 with a prescribed spacing maintained therebetween.

As best seen in FIG. 3, the pressing member 48 is screwed onto an externally threaded section of the outer tubular member 30a of the hub shaft 30. The pressing member 48 serves to press the inner race of the rolling bearing 42 and position the drive body 34 with respect to the hub body 32. When the pressing member 48 is screw-tightened, the inner race of the rolling bearing 42, the spacer 46, and the inner race of the rolling bearing 44 are pressed against an abutment of the hub shaft 30. Meanwhile, the rear hub 12 is fastened to the frame 14 by the frame 14 being pinched between the pressing member 48 and the rear derailleur 26 using the flanged nut 50.

Second Embodiment

Figure 6:
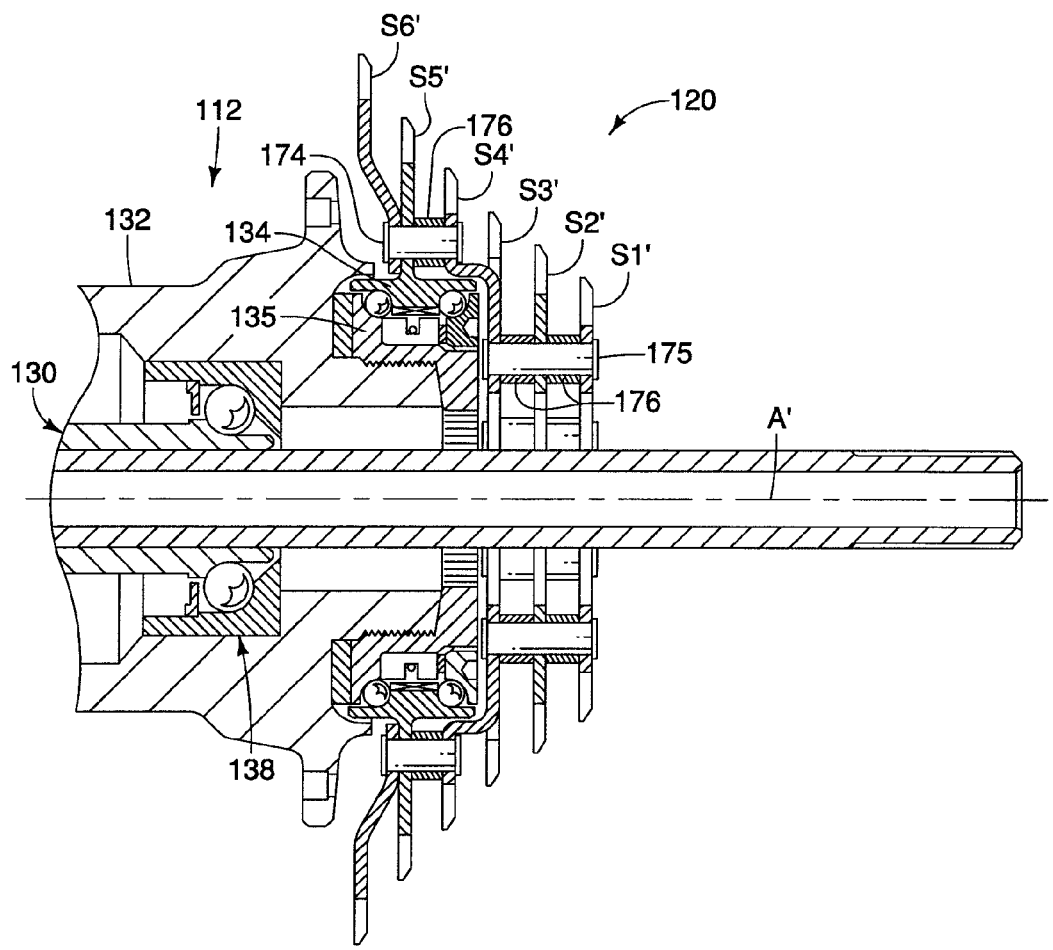
FIG. 6 is a cross sectional view of the bicycle sprocket support assembly mounted to one end of a rear hub in accordance with a second embodiment.
Figure 7:
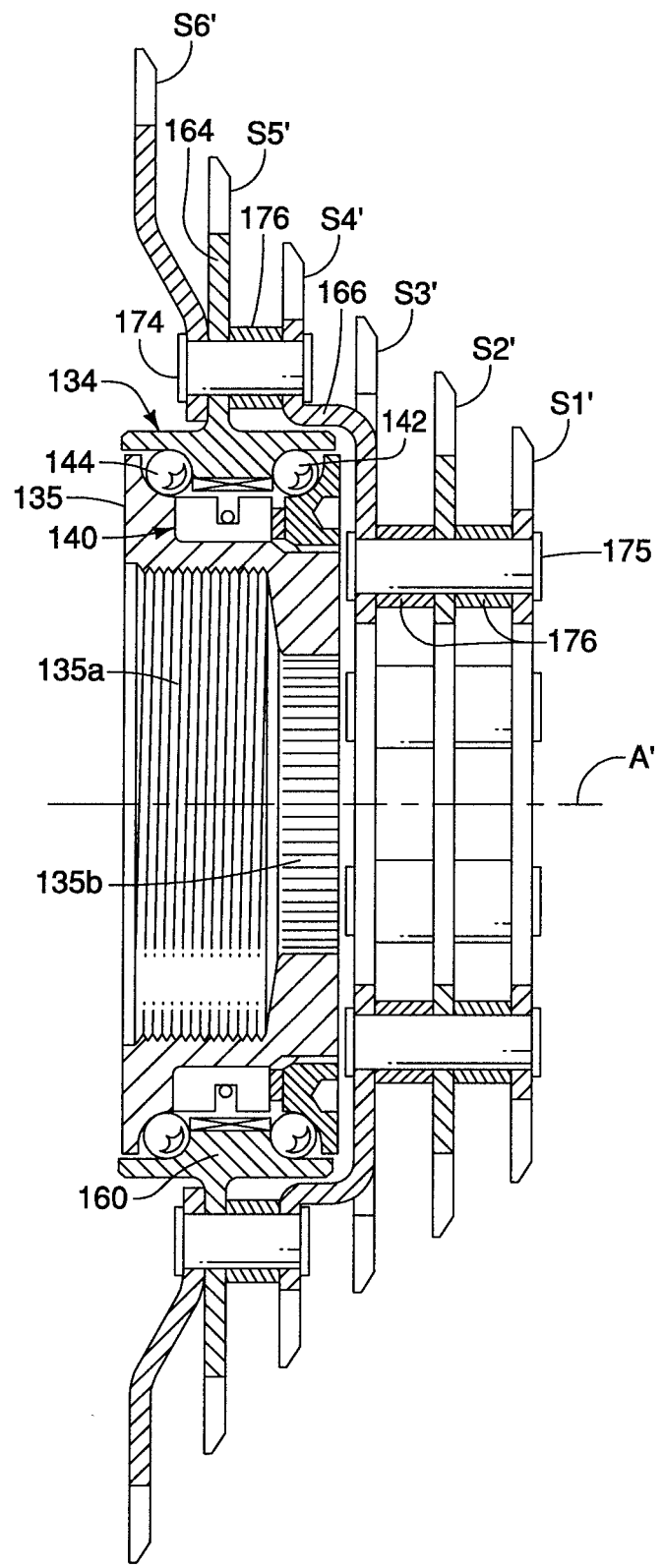
FIG. 7 is an enlarged cross sectional view of the bicycle sprocket support assembly after removal from the rear hub in accordance with the second embodiment.

Referring now to FIGS. 6 and 7, a rear hub 112 with a bicycle sprocket support assembly 120 in accordance with a second embodiment will now be explained. Although the previous embodiment presents a case in which the one-way clutch 40 is interposed between the rear hub 12 and the bicycle sprocket support assembly 20, this second embodiment presents a case in which the one-way clutch 40 is completely removable from the rear hub 112 as part of the bicycle sprocket support assembly 120.

In this second illustrated embodiment, the bicycle sprocket support assembly 120 includes a drive body 134, which is also referred to as a sprocket support body. The drive body 134 supports a plurality of sprockets S1' to S6'. The sprockets S1' to S6' form a sprocket cluster that is mounted to the drive body 134 in a non-rotatable manner. In this second illustrated embodiment, the bicycle sprocket support assembly 120 further includes a hub mounting member 135 that is mounted to the right end of the rear hub 112 as seen in FIG. 6. The hub mounting member 135 has a stepped shaped bore with a threaded section 135a that threadedly engages the rear hub 112 and a splined section 135b that receive an installation tool to install the bicycle sprocket support assembly 120 on the rear hub 112. A one-way clutch 140 is interposed between the drive body 134 and the hub mounting member 135. Two roller bearings 142 and 144 are also interposed between the drive body 134 and the hub mounting member 135. The one-way clutch 140 is configured so that the drive body 134 can only rotate in one direction with respect to the hub mounting member 135 on the roller bearings 142 and 144.

As seen in FIG. 7, the drive body 134 is a one-piece, unitary member that is constructed of a hard rigid material such as a metal material. The drive body 134 (i.e., the sprocket support body) includes a tubular shaped part 160 having interior and exterior surfaces arranged around a center longitudinal axis A'. The exterior surface of the tubular shaped part 160 has the sprocket S5' integrally formed as a one-piece, unitary member with the tubular shaped part 160 such that the radial inner section of the sprockets S5' constitutes a single, integrated sprocket support member 164 of the drive body 134. In other words, the sprocket support member 164 has a free end that includes a plurality of sprocket teeth (only two shown) to form an integrated sprocket that is a one-piece, unitary member with the sprocket support member 164 and the drive body 134 (i.e., the sprocket support body).

The sprockets S4' and 6' are attached to the sprocket support member 164 of the sprockets S5' by a plurality of fasteners 174. The sprocket S4' has a smaller outer diameter than the sprocket S5', while the sprocket S5' has a smaller outer diameter than the sprocket S6'. Thus, the sprocket S4' has a fewer teeth than the sprocket S5', while the sprocket S5' has a fewer teeth than the sprocket S6'.

In this illustrated embodiment, the sprockets S3' and S4' integrally formed as a one-piece, unitary member. In particular, a cantilever support 166 interconnects the sprockets S3' and S4', with the cantilever support 166 and the sprockets S3' and S4' being a one-piece, unitary member. The sprocket S3' has a smaller outer diameter than the sprocket S4'. The sprocket S1' and S2' are both attached to the sprocket S3' by a plurality of fasteners 175 (e.g., fastening elements such as rivets). Thus, the sprocket S4' effectively supports the sprocket S1' and S2' via the cantilever support 166 and the fasteners 175 such that the sprocket S4' supports a plurality of additional sprockets with smaller outer diameters than the sprocket S4'. More specifically, in this illustrated embodiment, the sprocket S4', the cantilever support 166 and the sprocket S3' are integrally formed together as a one-piece, unitary member with the sprockets S1' and S2' (constituting additional sprockets) that are fastened to the cantilever support by the fasteners 175. Spacers 176 are provided on the fasteners 174 and 176 for attaining the desired axial spacing of the sprocket S4' with respect to the sprocket S5', the desired axial spacing of the sprocket S1' with respect to sprocket S2', and the desired axial spacing of the sprocket S2' with respect to sprocket S3'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear sprocket support assembly comprising:
a sprocket support body having a tubular shaped part with an exterior surface and an interior surface arranged around a center longitudinal axis, the sprocket support body including one of a clutch pawl support section and a clutch engagement structure, the one of the clutch pawl support section and the clutch engagement structure being integrated with the sprocket support body as a one-piece, unitary member and being configured to engage a one-way clutch;
a first sprocket support member integrated with the exterior surface of the sprocket support body as a one-piece, unitary member and projecting radially from the exterior surface of the sprocket support body; and
at least first and second sprockets fixed to the first sprocket support member by at least one fastener with the first and second sprockets being supported at axially spaced apart locations along the center longitudinal axis of the sprocket support body, the first and second sprockets being located on opposite axially facing sides of the first sprocket support member.

2. The bicycle rear sprocket support assembly according to claim 1, wherein
the at least one fastener includes a plurality of fastening elements with the first and second sprockets being fixed to the first sprocket support member by at least one common one of the fastening elements.

3. A bicycle rear sprocket support assembly comprising:
a sprocket support body having a tubular shaped part with an exterior surface and an interior surface arranged around a center longitudinal axis;
a first sprocket support member integrated with the exterior surface of the sprocket support body as a one-piece, unitary member and projecting radially from the exterior surface of the sprocket support body;
at least first and second sprockets fixed to the first sprocket support member by at least one fastener with the first and second sprockets being supported at axially spaced apart locations along the center longitudinal axis of the sprocket support body;
a second sprocket support member integrated with the exterior surface of the sprocket support body as a one-piece, unitary member, with the second sprocket support member being axially spaced from the first sprocket support member along the center longitudinal axis of the sprocket support body;
a third sprocket fixed to the second sprocket support member by at least one fastener; and
a fourth sprocket fixed to the second sprocket support member by at least one fastener.

4. A bicycle rear sprocket support assembly comprising:
a sprocket support body having a tubular shaped part with an exterior surface and an interior surface arranged around a center longitudinal axis;
a first sprocket support member integrated with the exterior surface of the sprocket support body as a one-piece, unitary member and projecting radially from the exterior surface of the sprocket support body;

at least first and second sprockets fixed to the first sprocket support member by at least one fastener with the first and second sprockets being supported at axially spaced apart locations along the center longitudinal axis of the sprocket support body; and at least one sprocket having a mounting aperture that is mounted directly on the exterior surface of the sprocket support body.

5. The bicycle rear sprocket support assembly according to claim 1, wherein the first sprocket support member has a free end that includes a plurality of sprocket teeth to form an integrated sprocket that is a one-piece, unitary member with the first sprocket support member and the sprocket support body.

6. The bicycle rear sprocket support assembly according to claim 1, wherein the second sprocket includes a cantilever support that supports at least one sprocket having a smaller outer diameter than the second sprocket.

7. The bicycle rear sprocket support assembly according to claim 1, wherein the second sprocket includes a cantilever support that supports an additional sprocket having a smaller outer diameter than the second sprocket.

8. The bicycle rear sprocket support assembly according to claim 1, wherein the second sprocket includes a cantilever support that supports a plurality of additional sprockets having smaller outer diameters than the second sprocket.

9. The bicycle rear sprocket support assembly according to claim 8, wherein the second sprocket, the cantilever support and one of the additional sprockets are integrally formed together as a one-piece, unitary member, and another of the additional sprockets is fastened to the cantilever support by at least one fastener.

10. The bicycle rear sprocket support assembly according to claim 1, further comprising, at least one sprocket having a mounting aperture that is mounted directly on the exterior surface of the sprocket support body, the exterior surface of the tubular shaped part having an annular abutment that acts as a stop for locating the at least one sprocket.

11. The bicycle rear sprocket support assembly according to claim 4, wherein the exterior surface of the tubular shaped part has an annular abutment that acts as a stop for locating the at least one sprocket.

\* \* \* \* \*